United States Patent
Maeda

(10) Patent No.: US 11,868,165 B2
(45) Date of Patent: Jan. 9, 2024

(54) COMPUTER-READABLE RECORDING MEDIUM STORING CONTROL PROGRAM, INFORMATION PROCESSING DEVICE, AND CONTROL METHOD

(71) Applicant: FUJITSU LIMITED, Kawasaki (JP)

(72) Inventor: Munenori Maeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 17/874,335

(22) Filed: Jul. 27, 2022

(65) Prior Publication Data

US 2023/0161640 A1     May 25, 2023

(30) Foreign Application Priority Data

Nov. 22, 2021   (JP) .................................. 2021-189231

(51) Int. Cl.
*G06F 1/00*     (2006.01)
*G06F 9/50*     (2006.01)
*G06F 1/14*     (2006.01)
*G06F 1/28*     (2006.01)

(52) U.S. Cl.
CPC .............. *G06F 9/5094* (2013.01); *G06F 1/14* (2013.01); *G06F 1/28* (2013.01)

(58) Field of Classification Search
CPC . G06F 9/5094; G06F 1/14; G06F 1/28; G06F 1/3206; G06F 1/3243
See application file for complete search history.

(56) References Cited

U.S. PATENT DOCUMENTS

| | | | |
|---|---|---|---|
| 10,180,712 B2 * | 1/2019 | Lee | G06F 1/3206 |
| 2010/0010857 A1 * | 1/2010 | Fadell | G06Q 50/06 |
| | | | 705/412 |
| 2012/0089665 A1 * | 4/2012 | Chung | H04L 12/2823 |
| | | | 709/203 |
| 2013/0289773 A1 * | 10/2013 | Waki | G05F 5/00 |
| | | | 700/297 |
| 2014/0189413 A1 * | 7/2014 | Hasenplaugh | G06F 1/3206 |
| | | | 713/340 |
| 2014/0344602 A1 | 11/2014 | Son et al. | |
| 2020/0257605 A1 * | 8/2020 | Suzuki | G06F 11/3006 |
| 2020/0285510 A1 | 9/2020 | Maeda | |

FOREIGN PATENT DOCUMENTS

| | | |
|---|---|---|
| JP | 2011-227708 A | 11/2011 |
| JP | 2014-225263 A | 12/2014 |
| JP | 2020-144737 A | 9/2020 |

* cited by examiner

*Primary Examiner* — Xuxing Chen
(74) *Attorney, Agent, or Firm* — Fujitsu Intellectual Property Center

(57) ABSTRACT

A non-transitory computer-readable recording medium stores a control program for each of control circuits in an information processing device constituted by a plurality of the control circuits and for causing a computer to execute a process including: when synchronization of power consumption between the respective control circuits is detected, computing delay time of an own control circuit such that the control circuits have the delay time different from each other; disclosing data of the power consumption at a past time point with respect to the delay time, to other control circuits as the data of the current power consumption; and performing load balancing by using the data of the power consumption disclosed to the other control circuits and the data of the power consumption disclosed by the other control circuits.

7 Claims, 12 Drawing Sheets

N: NUMBER OF ALL CPUS
f : VIRTUAL FREQUENCY Hz OF POWER CONSUMPTION
rand(0,x): UNIFORM RANDOM NUMBER WITH LOWER LIMIT 0 AND UPPER LIMIT N
$\delta$ : DELAY TIME

FIG. 12
AFTER CARRYING OUT DYNAMIC LOAD BALANCING (TRADITIONAL)
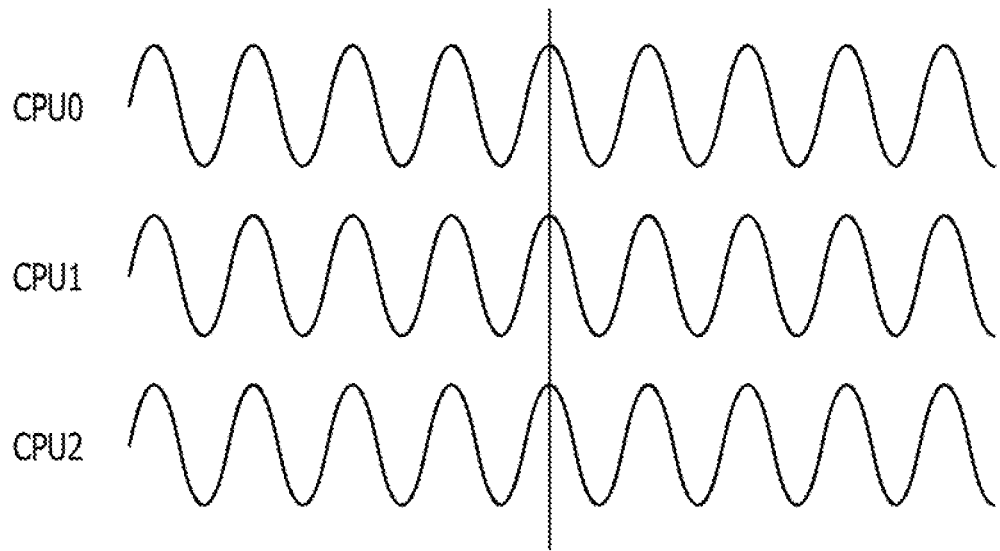
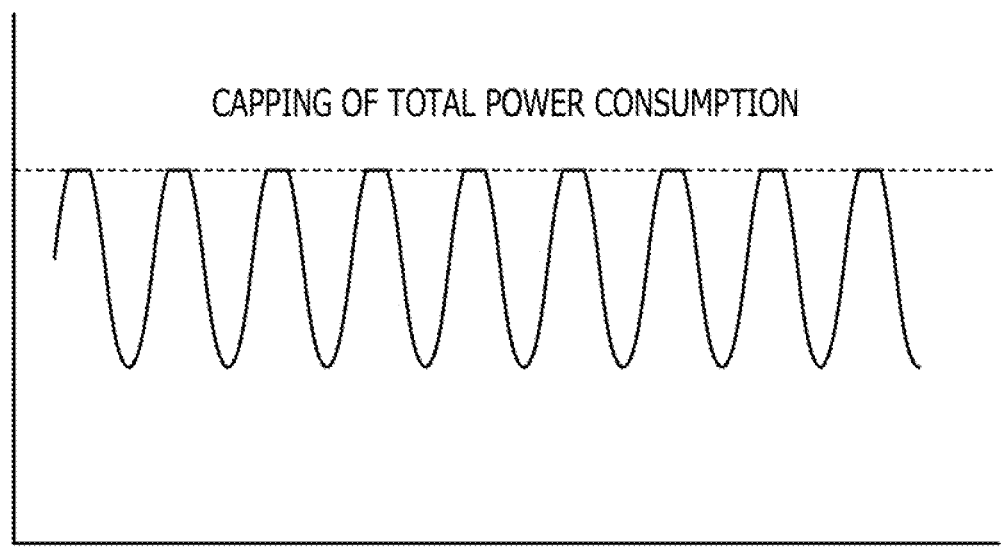
CAPPING OF TOTAL POWER CONSUMPTION

COMPUTER-READABLE RECORDING MEDIUM STORING CONTROL PROGRAM, INFORMATION PROCESSING DEVICE, AND CONTROL METHOD

CROSS-REFERENCE TO RELATED APPLICATION

This application is based upon and claims the benefit of priority of the prior Japanese Patent Application No. 2021-189231, filed on Nov. 22, 2021, the entire contents of which are incorporated herein by reference.

FIELD

The embodiments discussed herein are related to a control program and the like having an architecture that streamlines data transfer.

BACKGROUND

In a situation where one central processing unit (CPU) repeatedly accesses system resources, peaks (rises) and bottoms (falls) of changes in power consumption occur alternately. For example, the corresponding case is a case where the same processing is repeatedly performed using a loop, such as storage input and output (IO) processing and routine batch processing of a work using a database.
Japanese Laid-open Patent Publication No. 2011-227708 and Japanese Laid-open Patent Publication No. 2014-225263 are disclosed as related art.

SUMMARY

According to an aspect of the embodiments, a non-transitory computer-readable recording medium stores a control program for each of control circuits in an information processing device constituted by a plurality of the control circuits and for causing a computer to execute a process including: when synchronization of power consumption between the respective control circuits is detected, computing delay time of an own control circuit such that the control circuits have the delay time different from each other; disclosing data of the power consumption at a past time point with respect to the delay time, to other control circuits as the data of the current power consumption; and performing load balancing by using the data of the power consumption disclosed to the other control circuits and the data of the power consumption disclosed by the other control circuits.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a reference diagram illustrating changes in power consumption when dynamic load balancing is performed.

DESCRIPTION OF EMBODIMENTS

Figure 11:
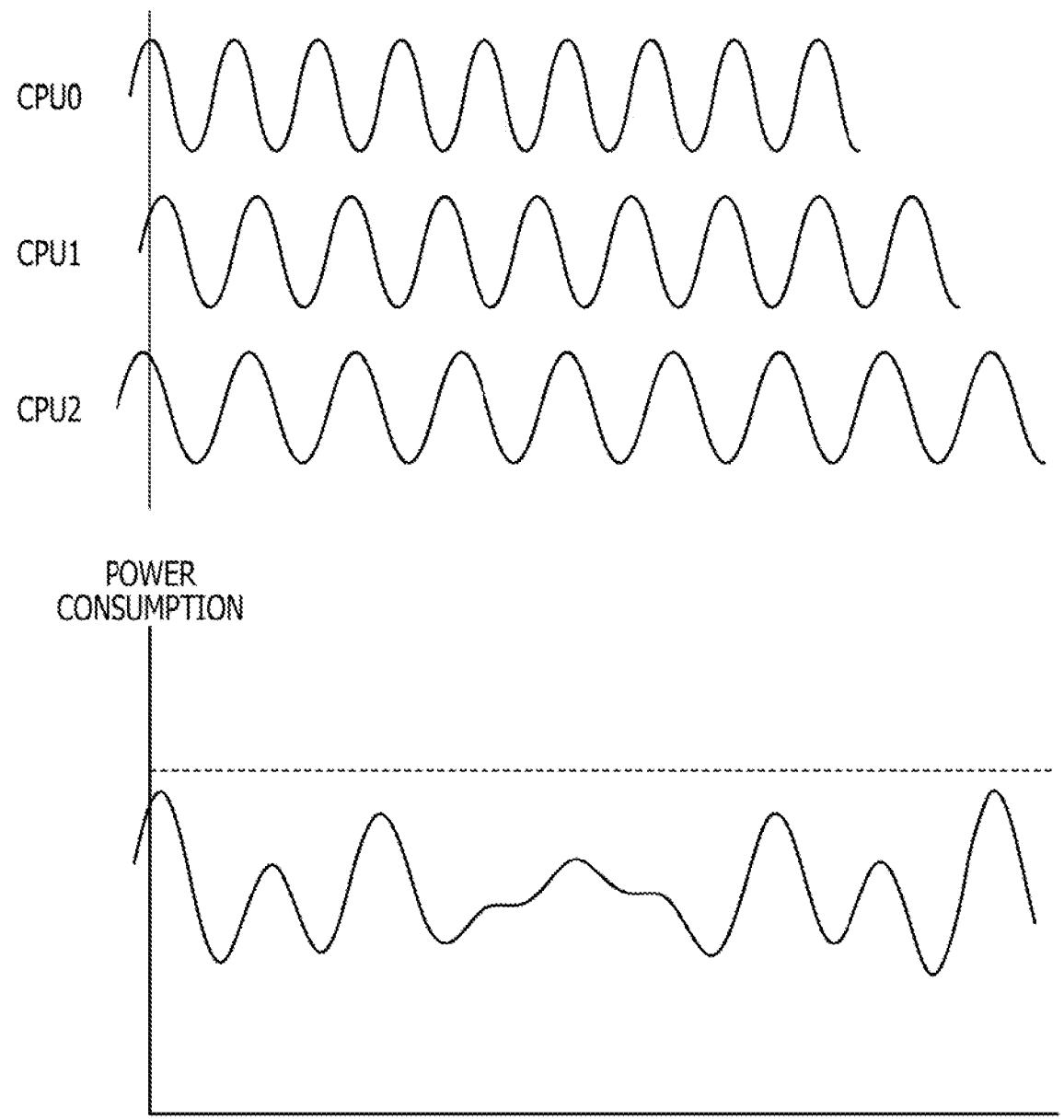
FIG. 11 is a reference diagram illustrating changes in power consumption when dynamic load balancing is not performed.

In a distributed processing system constituted by a plurality of CPUs, load balancing is not dynamically performed when the load on every CPU is low. When load balancing is not dynamically performed, since the processing allocations to the CPUs are uneven, the peaks and bottoms of power consumption do not match between the respective CPUs, and the power consumption of the entire system does not exceed the total amount of power consumption specified at the time of design. FIG. 11 is a reference diagram illustrating changes in power consumption when dynamic load balancing is not performed. As illustrated in FIG. 11, when dynamic load balancing is not performed, the peaks and bottoms of power consumption do not match between the respective CPUs. Then, the power consumption of the entire system does not exceed the total amount of power consumption.

In contrast to this, when the load is high or low in any of the CPUs, the load is dynamically balanced between the CPUs at an appropriate timing. When the load is dynamically balanced, the processing allocations to the CPUs are subjected to feedback such as checking the status of other CPUs at the time of execution and making the processing allocations even. As a result, the peaks and bottoms of power consumption gradually match between the respective CPUs. This phenomenon is called a synchronization phenomenon. FIG. 12 is a reference diagram illustrating changes in power consumption when dynamic load balancing is performed. As illustrated in the upper figure of FIG. 12, when dynamic load balancing is performed, the peaks and bottoms of power consumption slowly match between the respective CPUs, and the synchronization phenomenon occurs.

When the synchronization phenomenon occurs, since the peaks and bottoms of power consumption match between the respective CPUs, the power consumption of the entire system sometimes reaches the total amount of power consumption specified at the time of design at the peak. In such cases, since the power consumption of the entire system is not allowed to exceed the total amount of power consumption specified at the time of design, the system temporarily lowers the CPU clock to lower the performance (called power capping). As illustrated in the lower figure of FIG. 12, when the synchronization phenomenon occurs, the power consumption of the entire system reaches the total amount of power consumption at the peak parts, but is not allowed to exceed the total amount of power consumption, and thus the total power consumption is capped. This lowers the CPU performance.

Here, it is conceivable to avoid power capping by shifting the timing (phase) of the peak and bottom of one round in the power consumption of the CPU. For example, the system shifts the phase by lowering the CPU clock in CPU units or interposing a short-time sleep within the process to avoid power capping. However, lowering the CPU clock in CPU units or interposing a short-time sleep within the process will still lower the CPU performance.

In addition, a technique disclosed is capable of making the phases of a task contained in a task queue and a task newly put in the task queue different, by selecting a storage destination task queue for addition such that the processing amount of tasks that can be presumed from the pattern of processing amount is balanced for each task queue, such as adding tasks having the same pattern to the same queue.

Furthermore, a technique of controlling the performance of a processor by switching the power mode during the execution of a program is disclosed.

However, in a distributed processing system constituted by a plurality of CPUs, dynamically performing load balancing makes the usage rate even between the respective CPUs, but causes a problem that the peaks of power consumption are synchronized between the respective CPUs and the power consumption may not be leveled while the performance is maintained.

For example, with a technique that lowers the CPU clock in CPU units or interposes a short-time sleep within the process, it may be possible to avoid synchronization of the peaks of power consumption between the respective CPUs, but the performance will be lowered.

In addition, in the technique of making the phases of the tasks different, if the magnitude of the processing amount of the tasks is allowed to be estimated in advance, the phases of the tasks may be made different, and the synchronization of the peaks of power consumption between the respective CPUs may be avoided. However, when the estimation of the magnitude of the processing amount of the tasks in advance is not allowed, it is difficult to avoid synchronization of the peaks of power consumption between the respective CPUs. As a result, the peaks of power consumption are synchronized between the respective CPUs, and the power consumption is not allowed to be leveled while the performance is maintained.

In addition, the technique of switching the power mode is not a technique relating to dynamic balancing of load between CPUs in the first place.

One aspect aims to avoid synchronizing the peaks of power consumption between respective CPUs and to level the power consumption while maintaining the performance.

Hereinafter, embodiments of a control program, an information processing device, and a control method will be described in detail with reference to the drawings. Note that the embodiments are not limited by these embodiments. In addition, the embodiments may be appropriately combined with each other unless otherwise contradicted.

Figure 1:
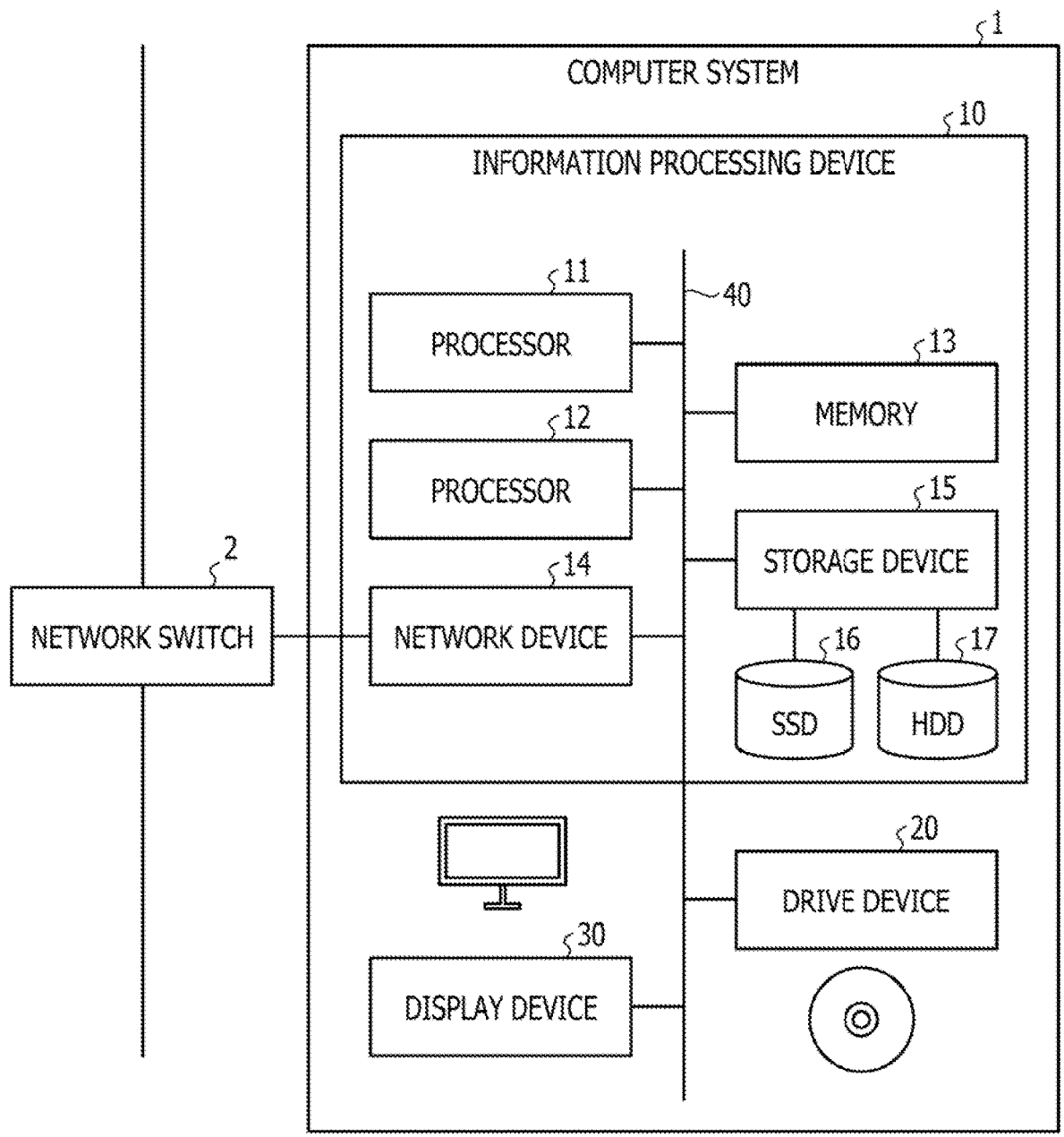
FIG. 1 is a hardware configuration diagram of a computer system.

FIG. 1 is a hardware configuration diagram of a computer system. A computer system 1 includes an information processing device 10, a drive device 20, and a display device 30.

The information processing device 10 includes processors 11 and 12, a memory 13, a network device 14, a storage device 15, a solid state drive (SSD) 16, and a hard disk drive (HDD) 17. The processors 11 and 12, the memory 13, the network device 14, the storage device 15, the drive device 20, and the display device 30 are connected to each other by a bus 40.

In addition, the processors 11 and 12 each have a plurality of cores. The processors 11 and 12 load a program into the memory 13 to execute the loaded program. In executing the program, threads included in the program are executed by the cores of each of the processors 11 and 12.

The processors 11 and 12 activate applications by executing the program. Then, by activating an application, the processors 11 and 12 cause the network device 14 to communicate with the outside via a network switch 2. In addition, by activating an application, the processors 11 and 12 perform data transfer in which the storage device 15 reads and writes data from and to the SSD 16 and the HDD 17. The control of a data transfer process using the network device 14 or the storage device 15 by the processors 11 and 12 in the present embodiment will be described in detail later. Here, in FIG. 1, the two processors 11 and 12 are depicted, but the number of processors is not particular restricted unless a single processor is employed.

The network device 14 is a high-speed IO device such as InfiniBand. The network device 14 is connected to the network switch 2. Upon acceptance of an instruction from the processor 11 or 12, the network device 14 transmits and receives data to and from an external device via the network switch 2.

The SSD 16 and the HDD 17 are large-capacity auxiliary storage devices. The SSD 16 and the HDD 17 store various programs and pieces of data.

The storage device 15 is a high-speed IO device such as nonvolatile memory express (NVMe). The storage device 15 is connected to the SSD 16 and the HDD 17. Upon acceptance of an instruction from the processor 11 or 12, the storage device 15 executes reading and writing of data from and to the SSD 16 and the HDD 17.

A removable portable storage medium such as a magnetic disk or an optical disc as an example is inserted into the drive device 20, and the drive device 20 writes or reads data to or from the inserted portable storage medium.

The display device 30 displays images transmitted from the processors 11 and 12. A user can obtain information by checking the display device 30.

Figure 2:
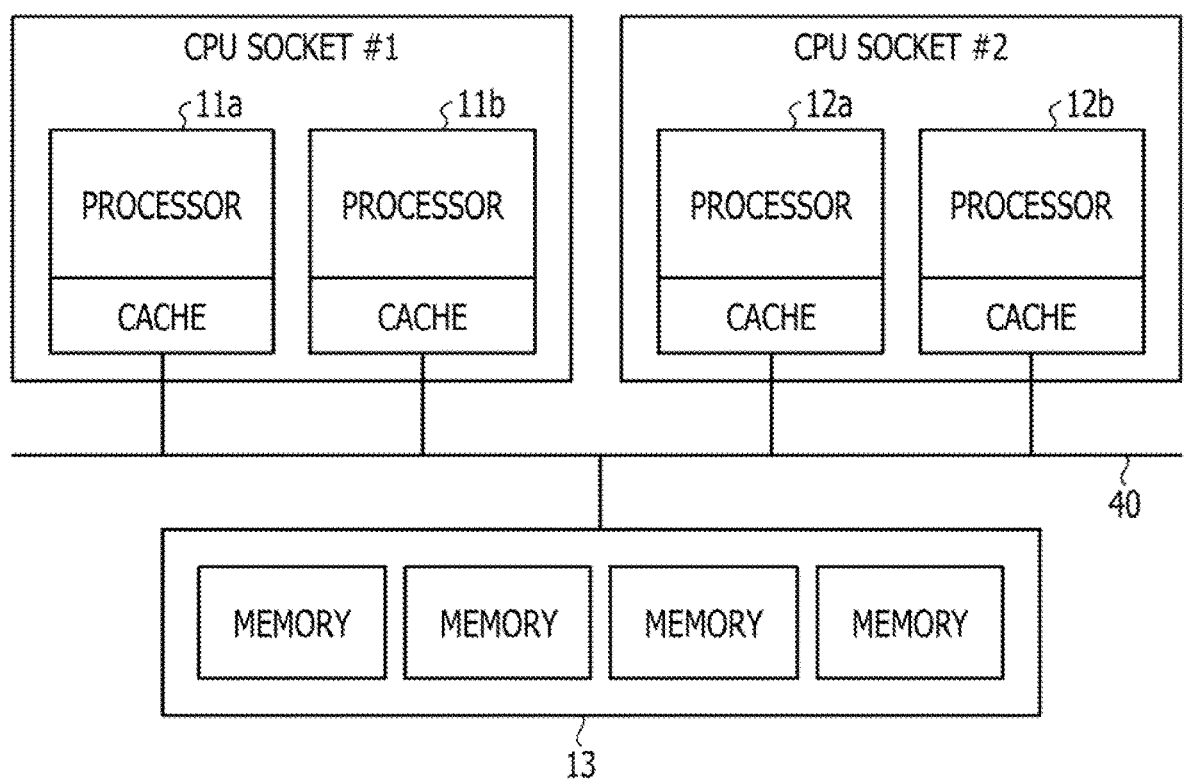
FIG. 2 is a diagram illustrating an example of the configuration of processors.

Here, an example of the configuration of the processors 11 and 12 will be described with reference to FIG. 2. FIG. 2 is a diagram illustrating an example of the configuration of the processors. As illustrated in FIG. 2, two processors 11a and 11b are mounted on one CPU socket #1. In addition, two processors 12a and 12b are mounted on one CPU socket #2. For example, multi-socket and multi-core are implemented.

Figure 3:
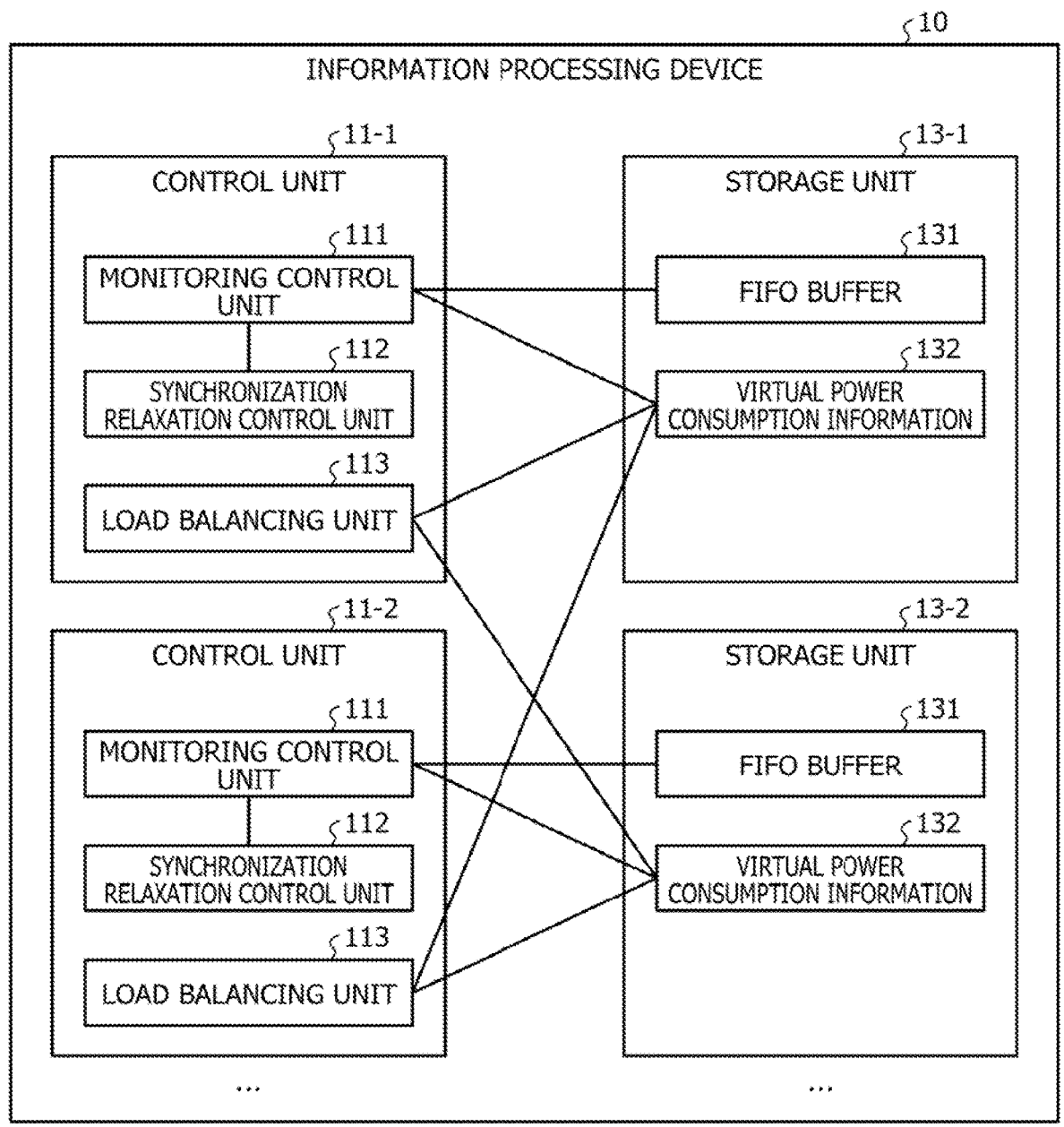
FIG. 3 is a diagram illustrating an example of the functional configuration of an information processing device according to an embodiment.

FIG. 3 is a diagram illustrating an example of the functional configuration of the information processing device according to the embodiment. The information processing device 10 according to the embodiment controls the multi-processor to relax the synchronization phenomenon that occurs at the time of load balancing. For example, when load balancing is performed, the peaks and bottoms of power consumption slowly match between the respective processors (CPUs), and the synchronization phenomenon occurs. When the synchronization phenomenon occurs, since the peaks and bottoms of power consumption match between the respective CPUs, the power consumption of the entire system sometimes reaches the total amount of power consumption specified at the time of design at the peak. In such cases, since the power consumption of the entire system is not allowed to exceed the total amount of power consumption specified at the time of design, the information processing device 10 is to perform power capping that temporarily lowers the CPU clock to lower the performance. At this point, instead of performing power capping, the information processing device 10 controls so as to shift the phase of the power consumption of each CPU in order to relax the synchronization of the power consumption between the respective CPUs.

Here, the synchronization phenomenon that occurs at the time of load balancing will be described. When a large number of oscillators are connected to each other and the speeds of oscillation affect each other, it is widely observed as a natural phenomenon that the synchronization phenomenon occurs between the oscillators. The Kuramoto model is well known as a mathematical model that explains the synchronization phenomenon. Note that, as documents about the Kuramoto model, for example, [Y. Kuramoto 75] Y. Kuramoto; In International Symposium on Mathematical Problems in Theoretical Physics, volume 39 of Lecture Notes in Physics, page 420, Springer, New York, (1975); [Y. Kuramoto 84] Y. Kuramoto: Chemical Oscillations, Waves, and Turbulence, Springer, Berlin, (1984); and [Nagasaki 2016] Nagasaki et al., Analysis of explosive synchronization transition on a complete bipartite graph, Annual Conference of the Japanese Society for Artificial Intelligence, 2016 can be mentioned.

In the embodiments, by applying the CPU power fluctuations to the Kuramoto model with the CPU power fluctuations as oscillators, each of the processors 11 and 12 monitors the synchronization status and detects the synchronization phenomenon. Then, when the synchronization phenomenon is detected, each of the processors 11 and 12 discloses data of the power consumption at a past time point corresponding to delay time calculated based on predetermined computation, to the other processor as data of the current power consumption. Then, each of the processors 11 and 12 dynamically performs load balancing using the disclosed data of the power consumption of each processor. As a result, the information processing device 10 may dynamically perform load balancing with data in which the data of the power consumption to be referred to is intentionally shifted, to allow the peak of power consumption to be shifted, and may level the power consumption while maintaining the performance.

The information processing device 10 includes control units 11-1 and 11-2 and storage units 13-1 and 13-2. Note that the control units 11-1 and 11-2 correspond to the processors 11 and 12, respectively, illustrated in FIG. 1. In addition, the storage units 13-1 and 13-2 correspond to the memory 13 illustrated in FIG. 1.

The control unit 11-1 is a processing unit that manages the entire information processing device 10 and includes a monitoring control unit 111, a synchronization relaxation control unit 112, and a load balancing unit 113. The storage unit 13-1 includes a first in first out (FIFO) buffer 131 and virtual power consumption information 132. Note that, since the control unit 11-2 has a function similar to the function of the control unit 11-1, the description thereof will be omitted. In addition, since the storage unit 13-2 has a function similar to the function of the storage unit 13-1, the description thereof will be omitted.

The FIFO buffer 131 is a cyclic buffer and stores the values of the power consumption pertaining to the processor 11 (CPU) at each time point. Note that the time points to be stored may be, for example, in 30-minute units or may be in one-hour units as long as the time points are designated in advance.

The virtual power consumption information 132 is information on power consumption to be disclosed as the current power consumption. Note that the virtual power consumption information 132 is set by the monitoring control unit 111.

Figure 4:
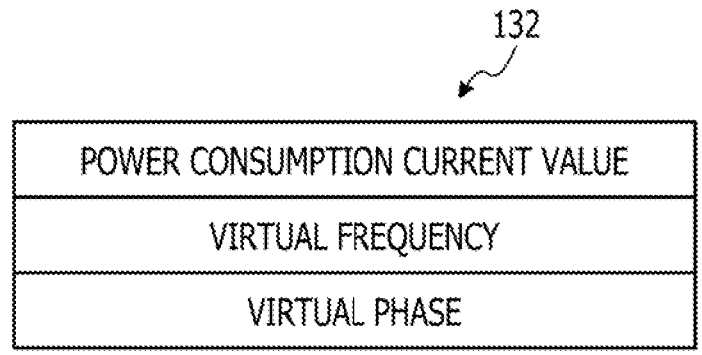
FIG. 4 is a diagram illustrating an example of virtual power consumption information.

Here, an example of the virtual power consumption information 132 will be described with reference to FIG. 4. FIG. 4 is a diagram illustrating an example of the virtual power consumption information. As illustrated in FIG. 4, the virtual power consumption information 132 stores a power consumption current value, a virtual frequency, and a virtual phase in association with each other. The power consumption current value is a virtual current value to be disclosed to the other processors as the value of the current power consumption. The power consumption current value is the power consumption value at a past time point with respect to the delay time calculated by the own processor on the basis of predetermined computation. The predetermined computation is carried out by the synchronization relaxation control unit 112. The virtual frequency is the frequency of the power consumption at the time point when the power consumption current value is calculated. The virtual phase is the phase of the power consumption at the time point when the power consumption current value is calculated.

Returning to FIG. 3, the monitoring control units 111 monitor data of the power consumption of each processor. For example, the monitoring control unit 111 saves the power consumption value pertaining to the own processor (CPU) in the FIFO buffer 131 at predetermined time intervals. Then, the monitoring control unit 111 passes the power consumption value saved in the FIFO buffer 131 through a low-pass filter. This is because the low-pass filter takes a moving average. The moving average is taken to suppress the influence of one value when being an abnormal value. For example, when the delay time is zero, which indicates the initial value, the monitoring control unit 111 calculates the moving average of the power consumption values saved in the FIFO buffer 131 from the latest power consumption value to the most recent period. In addition, when the delay time is set by the synchronization relaxation control unit 112 described later, the monitoring control unit 111 calculates the moving average of the power consumption values from the power consumption value at a past time point corresponding to the delay time to the most recent period. Then, the monitoring control unit 111 saves the calculated moving average as the current value of the power consumption in the power consumption current value of the virtual power consumption information 132. Thereafter, the monitoring control unit 111 discloses the power consumption current value saved in the virtual power consumption information 132 to the other processors at predetermined time intervals or in response to the request from another processor.

In addition, the monitoring control unit 111 has a trigonometric function approximation mechanism and performs a Fourier transform to calculate the frequency and phase of the power consumption at the time point when the power consumption current value is calculated. Then, the monitoring control unit 111 saves the frequency and phase of the power consumption in the virtual frequency and the virtual phase of the virtual power consumption information 132.

When it is detected that the power consumption is synchronized between the respective processors, the synchronization relaxation control unit 112 computes the delay time calculated on the basis of the predetermined computation. For example, the synchronization relaxation control unit 112 computes the delay time of the own processor such that the processors have the delay time different from each other. For example, the synchronization relaxation control unit 112 collects the frequency and phase of the power consumption of each processor when the power fluctuations of each processor are regarded as an oscillator. The frequency and phase of the power consumption of each processor are computed asynchronously by the monitoring control units 111 in each processor. Then, the synchronization relaxation control unit 112 computes an order parameter η from the frequency and phase of the power consumption of each processor. The order parameter η mentioned here is a parameter representing the degree of synchronization and corresponds to the order parameter η of the Kuramoto model. The order parameter η is one point inside the unit circle of radius of "1" on a complex plane, and an order parameter distance |η| is the distance from the origin zero. The order parameter distance |η| closer to one means stronger synchronization, whereas the order parameter distance |η| closer to zero means more disorder. The synchronization relaxation control unit 112 determines whether or not synchronization is in progress, by comparing the order parameter distance |η| with a synchronization threshold value ρ that identifies whether or not the synchronization is predefined synchronization.

Then, when it is determined that synchronization is in progress, the synchronization relaxation control unit 112 carries out phase moving control. The phase moving control refers to a control that moves the phase in order to avoid gaining the same phase as the phases of the other processors, assuming that the power consumption of the own processor and the other processors has the same phase (condition). For example, in the phase moving control, the current power consumption value in the own processor is treated as a past value going back by the phase difference. As an example, in the phase moving control, 360 degrees indicating one cycle is evenly divided by the number of processors, and the divided partitions (phases) are selected by random numbers. As another example, in the phase moving control, 360 degrees indicating one cycle is evenly divided by the number of processors, and a partition (phase) corresponding to the number assigned to the own processor is selected from among the divided partitions (phases). Then, in the phase moving control, the phase difference of the selected partition (phase) is converted into time, and the past time difference (delay time) δ is computed. Thereafter, in the phase moving control, the computed delay time δ is set in the monitoring control unit 111. After that, the monitoring control unit 111 releases, to the other processors, the moving average of the power consumption values for the most recent period from the power consumption value at the past time point going back by the set delay time δ, as the current power consumption value.

Here, the Kuramoto model, which is the basis, will be described. In the Kuramoto model, on premises of a fully connected graph in which all oscillators are connected to each other, the motion of each oscillator i is given by following expression (1). Note that, in expression (1), K denotes the strength of connection, N denotes the number of oscillators, and a denotes the natural frequency.

[Expression 1]

$$\frac{\partial \theta_i}{\partial t} = \omega_i + \frac{K}{N}\sum_{j=1}^{N}\sin(\theta_j - \theta_i),$$

$$i = 1 \ldots N,$$

(1)

Then, following expression (2) defines the order parameter η and a distance r.

[Expression 2]

$$\eta = re^{i\psi} = \frac{1}{N}\sum_{j=1}^{N}e^{i\theta_j}$$

(2)

There is a threshold value Kc in the strength of connection when N is sufficiently large, where the synchronization phenomenon regularly occurs when K≥Kc holds, and no synchronization is produced when k<Kc holds. Following expression (3) defines Kc mentioned here.

[Expression 3]

$$Kc = 2/(\tau g(0))$$

g:Probability density function of $\omega_i$ (3)

Note that the synchronization relaxation control unit 112 only has to compute the order parameter η by applying the natural frequency and phase of the power consumption of the own processor to $\omega_i$ and $\theta_i$, respectively, and applying the phases of the power consumption of the other processors to $\theta_j$. The natural frequency is the frequency of the own processor i when the own processor i is completely unaffected by the other oscillators (the other processors). However, in reality, since the oscillators affect each other, the natural frequency of the own processor i is treated as the frequency at a certain time point. Then, in the Kuramoto model, the relationship of K≥Kc is established (Kuramoto transition occurs) when the order parameter η is close to one, and the relationship of K<Kc is established when the order parameter η is close to zero. Thus, the synchronization relaxation control unit 112 determines that a synchronization state has been brought about if the order parameter distance |η| is equal to or greater than the synchronization threshold value ρ that identifies whether or not the synchronization is predefined synchronization, and determines that an asynchronous state has been brought about if the order parameter distance |η| is less than the synchronization threshold value ρ.

The load balancing unit 113 dynamically executes load balancing in accordance with each power consumption current value in the virtual power consumption information 132 stored in each processor. For example, as an approach for dynamically balancing load, the load balancing unit 113 only has to apply an approach of making the size of the load (task) even between two processors defined by a random algorithm. Such an approach includes a work stealing method, a work sharing method, and the like, but any approach other than static load balancing that performs load balancing planned beforehand may be adopted. As an example, Japanese Laid-open Patent Publication No. 2020-144737, in which load balancing between a plurality of processors is improved, can be mentioned.

Figure 5:
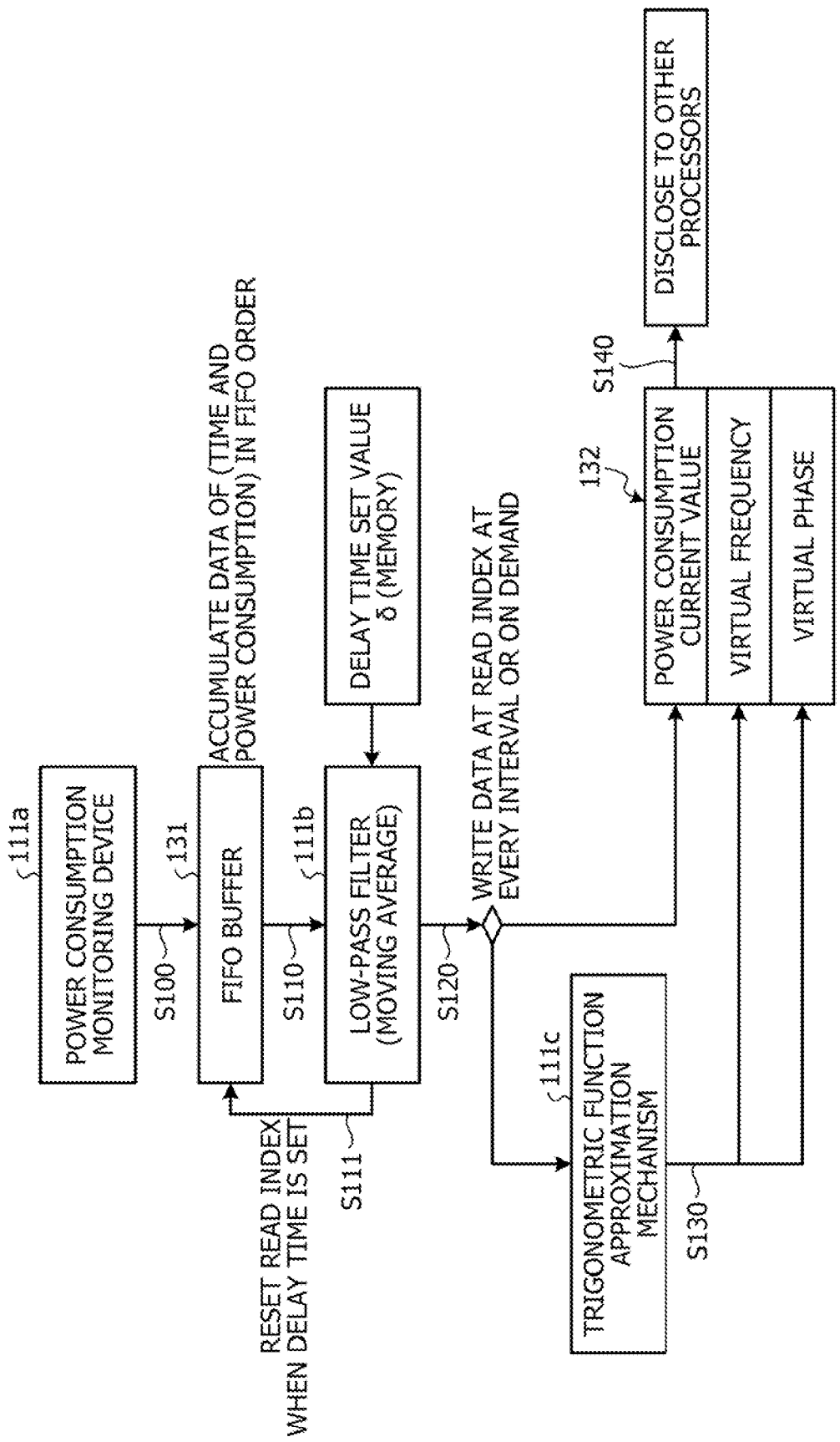
FIG. 5 is a diagram illustrating an example of the flow of monitoring control according to the embodiment.

FIG. 5 is a diagram illustrating an example of the flow of monitoring control according to the embodiment. As illustrated in FIG. 5, the monitoring control unit 111 reads the power consumption value from a power consumption monitoring device 111a and saves the read power consumption value in the FIFO buffer 131 at predetermined time intervals (S100). Note that the power consumption monitoring device 111a is not limited to hardware, but may be software. The FIFO buffer 131 accumulates data of the time and power consumption value in FIFO order.

The monitoring control unit 111 passes the power consumption values saved in the FIFO buffer 131 from the read index to the most recent period through a low-pass filter 111b and takes the moving average. For example, when the delay time set value δ is zero, which indicates the initial value, the read index of the FIFO buffer 131 indicates the latest position. Therefore, the low-pass filter 111b calculates the moving average of the power consumption values for the most recent period from the latest power consumption value indicated by the read index (S110). In addition, when the delay time set value δ is set, the monitoring control unit 111 resets the read index corresponding to the delay time set value δ (S111). Then, the low-pass filter 111b calculates the moving average of the power consumption values from the reset read index to the most recent period (S110). For example, the monitoring control unit 111 calculates the moving average of the power consumption values in the most recent period toward the past from the power consumption value at the past time point corresponding to the delay time.

Then, the monitoring control unit 111 writes the moving average corresponding to the read index to the power consumption current value of the virtual power consumption information 132 at predetermined time intervals or in response to a request from another processor (S120). In addition, the monitoring control unit 111 calculates the frequency and phase of the power consumption at the time point when the power consumption current value was calculated, using a trigonometric function approximation mechanism 111c, and saves the calculated frequency and phase in the virtual frequency and the virtual phase of the virtual power consumption information 132 (S130). Then, the monitoring control unit 111 discloses the power consumption current value saved in the virtual power consumption information 132 to the other processors (S140).

This allows the load balancing unit 113 to shift the phase of the power consumption of each processor by dynamically executing load balancing in accordance with the power consumption current values individually disclosed by each processor. For example, since the monitoring control units 111 mutually exchange data of the power consumption at a certain time point in the past based on the delay time individually different for each processor, the information processing device 10 may avoid synchronizing the peaks of the power consumption between the respective processors due to load balancing.

Figure 6:
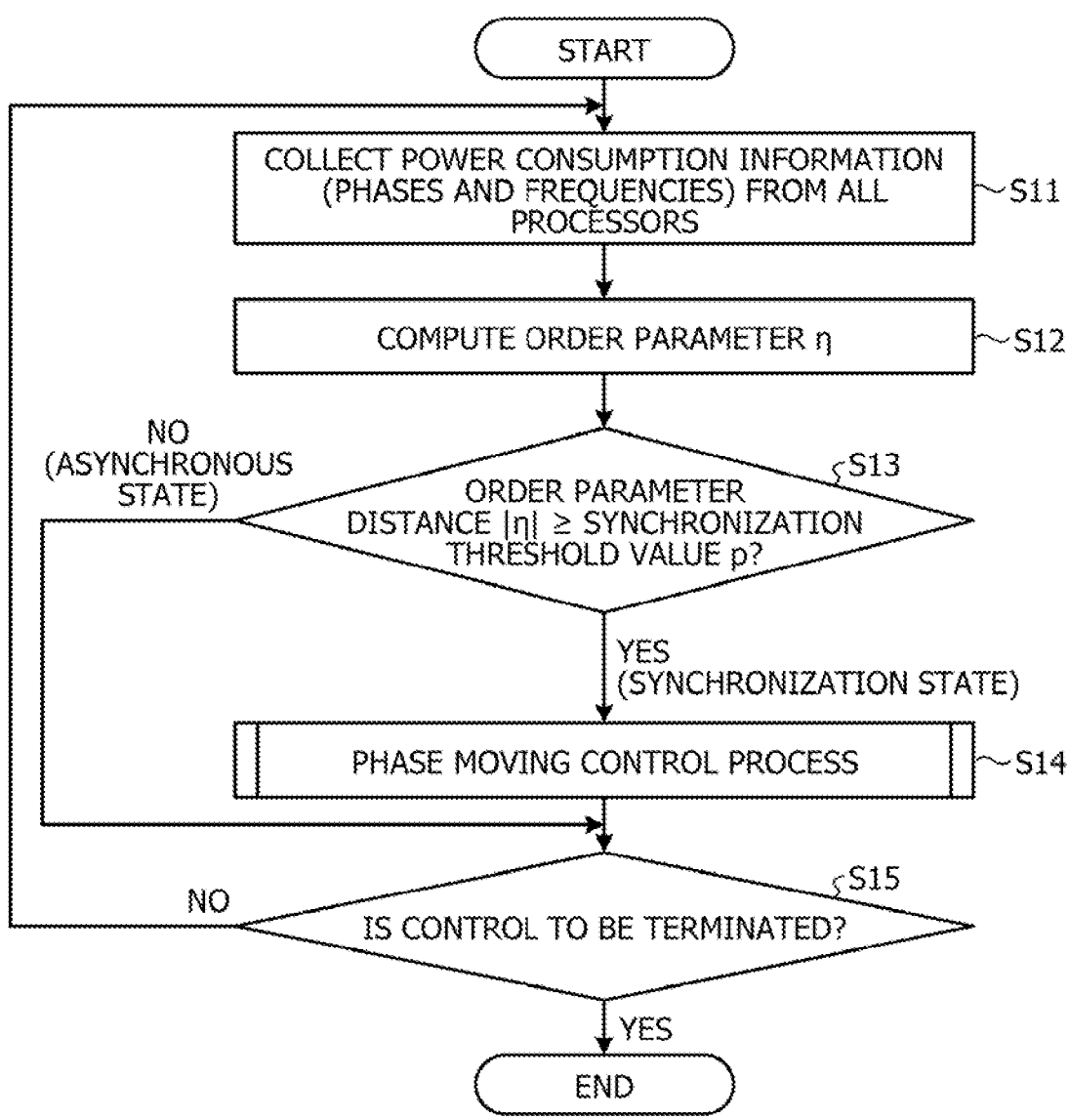
FIG. 6 is a diagram illustrating an example of the flowchart of a synchronization relaxation control process according to the embodiment.

FIG. 6 is a diagram illustrating an example of the flowchart of a synchronization relaxation control process according to the embodiment. Note that the synchronization relaxation control unit 112 requests the latest power consumption information from the own processor and the other processors at a predetermined timing. As illustrated in FIG. 6, the synchronization relaxation control unit 112 collects the latest power consumption information (the phases and frequencies) from all the processors (step S11).

Then, the synchronization relaxation control unit 112 computes the order parameter η using the power consumption information (the phases and frequencies) collected from all the processors (step S12). For example, the synchronization relaxation control unit 112 applies the power consumption information (the phases and frequencies) of all the processors to expressions (1) and (2) to compute the order parameter n.

Then, the synchronization relaxation control unit 112 determines whether or not the order parameter distance |η| is equal to or greater than the synchronization threshold value ρ (step S13). When it is determined that the order parameter distance |η| is equal to or greater than the synchronization threshold value ρ (step S13; Yes), the synchronization relaxation control unit 112 concludes that the synchronization state has been brought about and executes the phase moving control process (step S14). Note that the flowchart of the phase moving control process will be described later. Then, the synchronization relaxation control unit 112 proceeds to step S15.

On the other hand, when it is determined that the order parameter distance |η| is not equal to or greater than the synchronization threshold value ρ (step S13; No), the synchronization relaxation control unit 112 concludes that the asynchronous state has been brought about and proceeds to step S15.

In step S15, the synchronization relaxation control unit 112 determines whether or not the synchronization relaxation control is to be terminated (step S15). For example, the synchronization relaxation control unit 112 determines that the synchronization relaxation control is to be terminated, for example, when an operation for terminating the execution of the synchronization relaxation control is performed or when there is an interrupt for termination. When it is determined that the synchronization relaxation control is not to be terminated (step S15; No), the synchronization relaxation control unit 112 proceeds to step S11.

On the other hand, when it is determined that the synchronization relaxation control is to be terminated (step S15; Yes), the synchronization relaxation control unit 112 terminates the synchronization relaxation control process.

Figure 7:
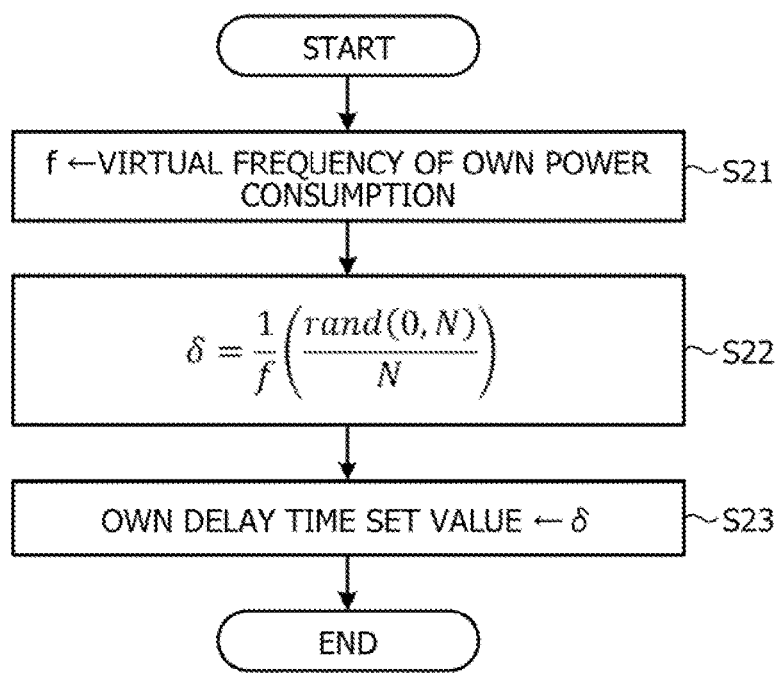
FIG. 7 is a diagram illustrating an example of the flowchart of a phase moving control process.

FIG. 7 is a diagram illustrating an example of the flowchart of the phase moving control process. As illustrated in FIG. 7, in the phase moving control process, the virtual frequency of the own power consumption is set as f (step S21). For example, in the phase moving control process, the virtual frequency stored in the own virtual power consumption information 132 is copied to f.

Then, in the phase moving control process, the virtual frequency f is substituted into the following expression to compute the delay time δ (step S22). For example, in the phase moving control process, 360 degrees indicating one cycle is evenly divided by the number of all processors (CPUs) N, and the divided partitions (phases) are selected by random numbers. Note that N in the following expression denotes the number of all processors (CPUs). In addition, rand(0, N) denotes a function for calculating a uniform random number between the lower limit "0" and the upper limit "N". δ=(1/f)×(rand(0, N)/N)

Then, in the phase moving control process, the computed delay time δ is set as the own delay time set value (step S23). For example, in the phase moving control process, the delay time δ is copied to the own delay time set value. After that, in the phase moving control process, the delay time set value δ is set in the monitoring control unit 111.

Figure 8:
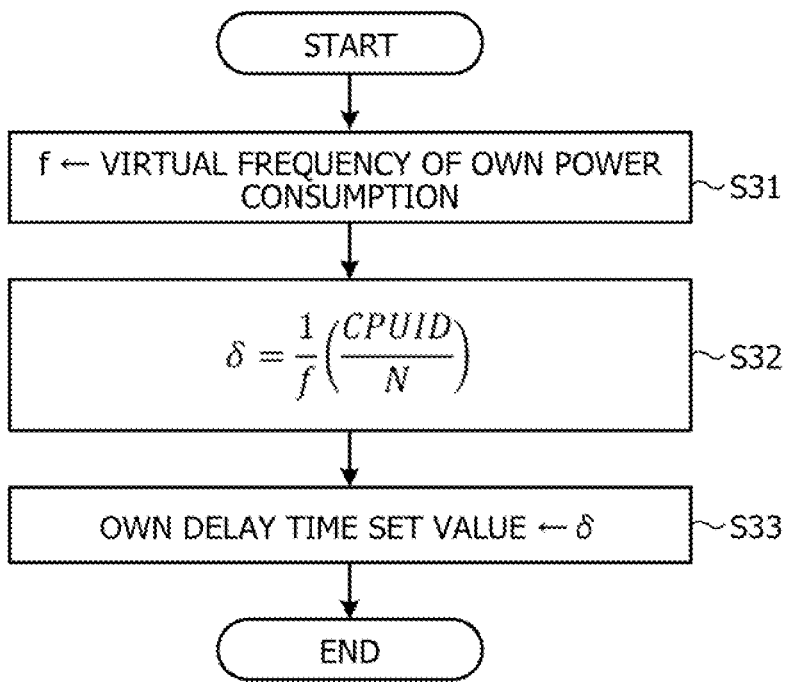
FIG. 8 is a diagram illustrating another example of the flowchart of the phase moving control process.

FIG. 8 is a diagram illustrating another example of the flowchart of the phase moving control process. As illustrated in FIG. 8, in the phase moving control process, the virtual frequency of the own power consumption is set as f (step S31). For example, in the phase moving control process, the virtual frequency stored in the own virtual power consumption information 132 is copied to f.

Then, in the phase moving control process, the virtual frequency f is substituted into the following expression to compute the delay time δ (step S32). For example, in the phase moving control, 360 degrees indicating one cycle is evenly divided by the number of all CPUs N, and a partition (phase) corresponding to the identifier (ID) corresponding to the own processor (CPUID) is selected from among the divided partitions (phases). Note that N in the following expression denotes the number of all processors (CPUs).
δ=(1/f)×(CPUID/N)

Then, in the phase moving control process, the computed delay time δ is set as the own delay time set value (step S33). For example, in the phase moving control process, the delay time δ is copied to the own delay time set value. After that, in the phase moving control process, the delay time set value δ is set in the monitoring control unit 111.

After that, in the phase moving control process, the delay time set value δ is set in the monitoring control unit 111. Then, the monitoring control unit 111 releases data of the power consumption (power consumption current value) at a certain time point in the past based on the delay time set value δ of the own processor, which is a delay time set value individually different for each processor.

Figure 9:
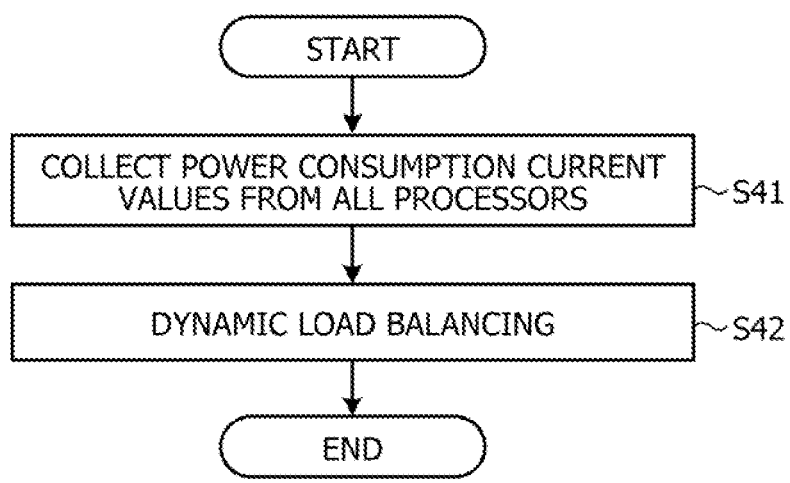
FIG. 9 is a diagram illustrating an example of the flowchart of a load balancing process.

FIG. 9 is a diagram illustrating an example of the flow-chart of the load balancing process according to the embodiment. Note that the load balancing unit 113 executes the load balancing process at the timing when the own power consumption current value is disclosed, for example. As illustrated in FIG. 9, the load balancing unit 113 collects the latest power consumption information (power consumption current values) from all the processors (step S41). Then, the load balancing unit 113 dynamically executes load balancing in accordance with the collected power consumption current values of all the processors (step S42).

This allows the load balancing unit 113 to shift the phase of the power consumption of each processor by dynamically executing load balancing in accordance with the power consumption current values individually disclosed by each processor. For example, since the monitoring control units 111 mutually exchange data of the power consumption at a certain time point in the past based on the delay time individually different for each processor, the information processing device 10 may avoid synchronizing the peaks of the power consumption between the respective processors due to load balancing.

Figure 10:
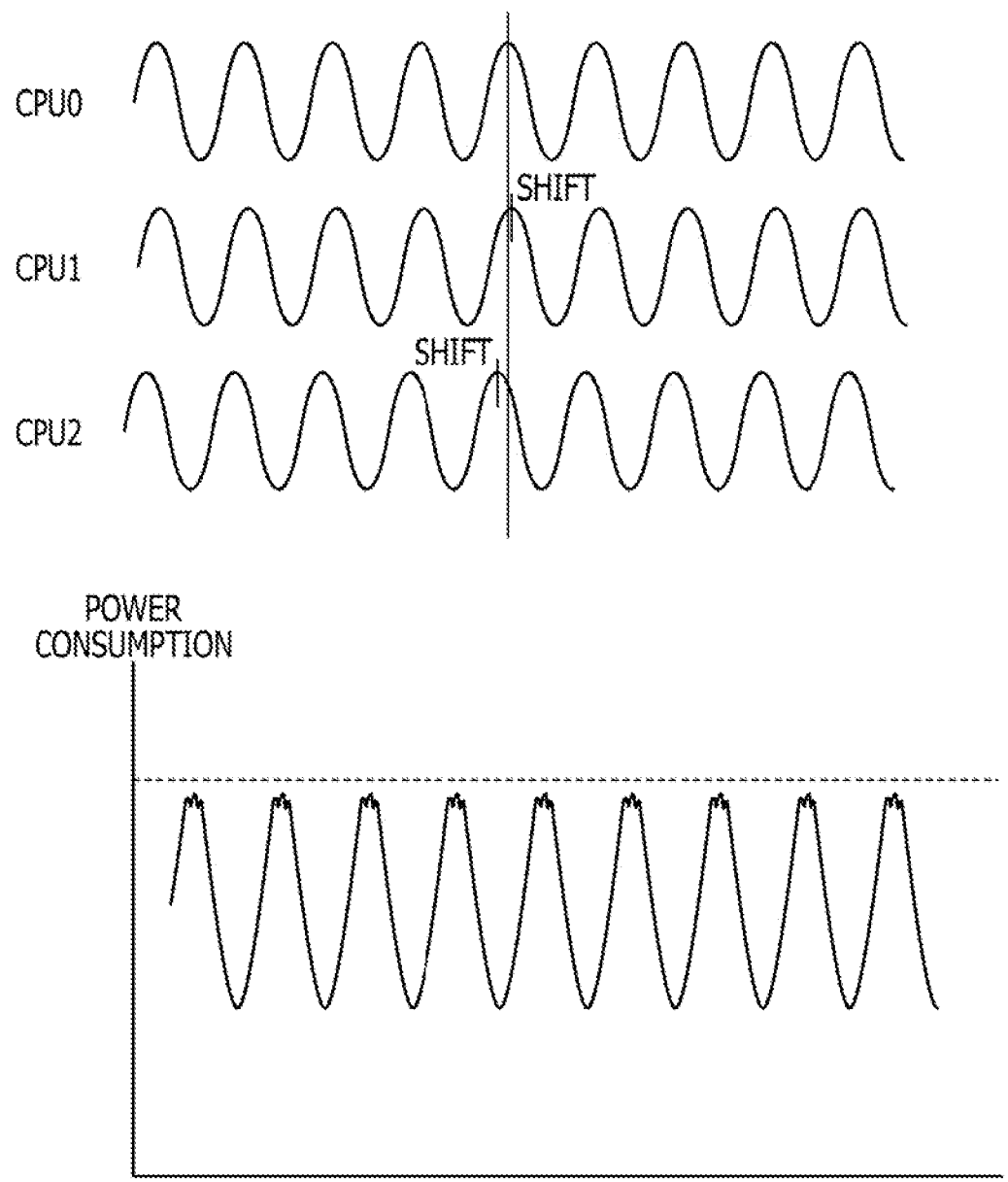
FIG. 10 is a diagram illustrating an effect of the control process according to the embodiment.

FIG. 10 is a diagram illustrating an effect of the control process by the information processing device according to the embodiment. Note that FIG. depicts a case where the information processing device 10 includes three CPUs (processors). As illustrated in the upper figure of FIG. 10, when the synchronization of the power consumption of the three CPUs is detected, each CPU releases the current power consumption value to the other CPUs as the power consumption value at a past time point based on the delay time individually different for each CPU. Therefore, each CPU is allowed to shift the phases in which the peaks overlap so as not to overlap by dynamically executing load balancing in accordance with the released power consumption values. Here, the peaks of power consumption of the three CPUs are shifted slightly from each other.

As a result, the information processing device 10 may shift the phases autonomously and asynchronously as it originally is without temporarily lowering the CPU clock as a system to lower the performance (capping of power) or altering the process for load balancing. Consequently, the information processing device 10 may avoid synchronizing the peaks of power consumption between the respective CPUs and may level the power consumption while maintaining the performance. As illustrated in the lower figure of FIG. 10, the whole power consumption does not reach the total amount of power consumption owing to the phase shift of the power consumption in each CPU, which allows the information processing device 10 to level the power consumption while maintaining the performance.

EFFECTS OF EMBODIMENT

According to the above embodiment, the information processing device 10 is constituted by a plurality of control units 11-1 and 11-2. When the synchronization of the power consumption between the respective control units 11-1 and 11-2 is detected, the control unit 11-1 computes the delay time of the own control unit 11-1 such that the control units 11-1 and 11-2 have the delay time different from each other. The control unit 11-1 discloses data of the power consumption at a past time point with respect to the delay time, to the other control unit 11-2 as data of the current power consumption. The control unit 11-1 performs load balancing using the data of the power consumption disclosed to the other control unit 11-2 and the data of the power consumption disclosed by the other control unit 11-2. This allows the information processing device 10 to avoid synchronizing the peaks of the power consumption between the respective control units 11-1 and 11-2 by the load balancing using the data of the power consumption at a time point with respect to different delay time and to level the power consumption.

In addition, according to the above embodiment, the control unit 11-1 evenly divides one cycle of the pattern of the power consumption by the number of the plurality of control units 11-1 and 11-2, selects an own partition of the control unit 11-1 based on a random number from among divided partitions, and calculates the delay time corresponding to the selected partition. This allows the information processing device 10 to reliably calculate the delay time different for each of the control units 11-1 and 11-2.

In addition, according to the above embodiment, the control unit 11-1 evenly divides one cycle of the pattern of the power consumption by the number of the plurality of control units 11-1 and 11-2, selects an own partition of the control unit 11-1 based on an identification number allocated for each of the control units 11-1 and 11-2 from among divided partitions, and calculates the delay time corresponding to the selected partition. This allows the information processing device 10 to reliably calculate the delay time different for each of the control units 11-1 and 11-2.

In addition, according to the above embodiment, the control unit 11-1 discloses, to the other control unit 11-2, a moving average of the data of the power consumption from the data of the power consumption at a past time point with respect to the delay time to the most recent period, as the data of the current power consumption. This allows the control unit 11-1 to suppress the influence when one piece of data of the power consumption is abnormal data and to disclose normal data to the other control unit 11-2.

In addition, according to the above embodiment, the control unit 11-1 inputs the data that relates to the power consumption of each of the control units 11-1 and 11-2 to the Kuramoto model to output an order parameter, and detects synchronization of the power consumption between the respective control units 11-1 and 11-2 by using the order parameter. This allows the control unit 11-1 to detect the synchronization of the power consumption, using the Kuramoto model.

OTHERS

Note that any information described herein or illustrated in the drawings, including the processing procedures, control procedures, specific names, and various sorts of data and parameters can be modified in any ways unless otherwise noted.

In addition, each component of each device illustrated in the drawings is functionally conceptual and does not necessarily have to be physically configured as illustrated in the drawings. For example, specific forms of distribution and integration of each device are not limited to those illustrated in the drawings. For example, the whole or a part of the device may be configured by being functionally or physically distributed or integrated in optional units according to various sorts of loads, usage statuses, or the like.

Furthermore, all or an optional part of individual processing functions performed in each device may be implemented by a CPU and a program analyzed and executed by the CPU, or may be implemented as hardware by wired logic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a control program for each of control circuits in an information processing device constituted by a plurality of the control circuits, and for causing a computer to execute a process comprising:
   when synchronization of power consumption between the respective control circuits is detected, computing delay time of an own control circuit such that the control circuits have the delay time different from each other;
   disclosing data of the power consumption at a past time point with respect to the delay time, to other control circuits as the data of the current power consumption; and
   performing load balancing by using the data of the power consumption disclosed to the other control circuits and the data of the power consumption disclosed by the other control circuits.

2. The non-transitory computer-readable recording medium according to claim 1, wherein
   the computing the delay time includes evenly dividing one cycle of a pattern of the power consumption by a number of the plurality of control circuits, selecting one partition of the own control circuit based on a random number from among divided partitions, and calculating the delay time that corresponds to the selected one partition.

3. The non-transitory computer-readable recording medium according to claim 1, wherein
   the computing the delay time includes evenly dividing one cycle of a pattern of the power consumption by a number of the plurality of control circuits, selecting one partition of the own control circuit based on an identification number allocated for each of the control circuits from among divided partitions, and calculating the delay time that corresponds to the selected one partition.

4. The non-transitory computer-readable recording medium according to claim 1, wherein
   the disclosing to the other control circuits includes disclosing, to the other control circuits, a moving average of the data of the power consumption from the data of the power consumption at a past time point with respect to the delay time to a most recent period, as the data of the current power consumption.

5. The non-transitory computer-readable recording medium according to claim 1, wherein
   the data that relates to the power consumption of each of the control circuits is input to a Kuramoto model to output an order parameter, and the synchronization of the power consumption between the respective control circuits is detected by using the order parameter.

6. An information processing device comprising:
   a memory; and
   a processor coupled to the memory and configured to:
   when synchronization of power consumption between respective control circuits in the information processing device constituted by the plurality of the control circuits is detected, compute delay time of an own control circuit such that the control circuits have the delay time different from each other;
   disclose data of the power consumption at a past time point with respect to the delay time, to other control circuits as the data of the current power consumption; and
   perform load balancing by using the data of the power consumption disclosed to the other control circuits and the data of the power consumption disclosed by the other control circuits.

7. A control method comprising:
   when synchronization of power consumption between respective control circuits in an information processing device constituted by the plurality of the control circuits is detected, computing delay time of an own control circuit such that the control circuits have the delay time different from each other;
   disclosing data of the power consumption at a past time point with respect to the delay time, to other control circuits as the data of the current power consumption; and
   performing load balancing by using the data of the power consumption disclosed to the other control circuits and the data of the power consumption disclosed by the other control circuits.

* * * * *